(12) United States Patent
Lu (10) Patent No.: US 10,718,366 B1
(45) Date of Patent: Jul. 21, 2020

(54) CONNECTING STRUCTURE

(71) Applicant: CHICONY POWER TECHNOLOGY CO., LTD., New Taipei (TW)

(72) Inventor: Wen-Yung Lu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/419,863

(22) Filed: May 22, 2019

(30) Foreign Application Priority Data

Feb. 13, 2019 (TW) .............................. 108104689 A (51) Int. Cl.
*F16B 21/07* (2006.01)
*F16B 5/06* (2006.01)
*G06F 1/16* (2006.01)

(52) U.S. Cl.
CPC ............ *F16B 21/073* (2013.01); *F16B 5/065* (2013.01); *G06F 1/16* (2013.01); *F16B 2200/00* (2018.08)

(58) Field of Classification Search
CPC ........... F16B 21/073; F16B 5/065; G06F 1/16
See application file for complete search history.

(56) References Cited

U.S. PATENT DOCUMENTS

| D548,732 S * | 8/2007 | Cebe ............................ D14/341 |
| 7,448,702 B2 * | 11/2008 | Chen ........................ G06F 1/181 |
| | | 292/150 |
| 9,303,667 B2 * | 4/2016 | Morris .................. F16B 5/0664 |
| 9,367,083 B2 | 6/2016 | Canova, Jr. et al. |
| 9,429,176 B2 * | 8/2016 | Morris ....................... F16B 2/22 |
| 9,447,806 B2 * | 9/2016 | Morris .................. F16B 5/0628 |
| 9,886,004 B2 | 2/2018 | Altenhoven et al. |
| 2010/0061045 A1 | 3/2010 | Chen |
| 2011/0299921 A1 | 12/2011 | Wei et al. |
| 2011/0314644 A1 | 12/2011 | Wei et al. |
| 2012/0212923 A1 | 8/2012 | Peng et al. |
| 2013/0135827 A1 | 5/2013 | Chao et al. |
| 2013/0334388 A1 | 12/2013 | Li |

(Continued)

FOREIGN PATENT DOCUMENTS

| CA | 2709726 | 1/2012 |
| CN | 102645762 A | 1/2012 |

(Continued)

*Primary Examiner* — Robert Sandy
*Assistant Examiner* — David M Upchurch
(74) *Attorney, Agent, or Firm* — Muncy, Geissler, Olds & Lowe, P.C.

(57) ABSTRACT

A connecting structure includes a first connecting portion and a second connecting portion. The first connecting portion includes a first board and a second board. The first board includes a first body, an extension board and a main rib. The first body extends toward a second object. The extension board is disposed on the first body. The main rib is connected to a first object and disposed along the first body and the extension board. The second board connects to the first object, the first body, and the extension board. The second connecting portion includes a base connecting to the second object and a non-closed columnar body connecting to the base. The non-closed columnar body includes a blocking wall extending toward the first object and a bottom board disposed on the blocking wall. The blocking wall and the bottom board form an accommodating space corresponding to the extension board.

15 Claims, 11 Drawing Sheets

(56) References Cited

U.S. PATENT DOCUMENTS

2014/0062273 A1    3/2014   Lee et al.
2015/0119117 A1    4/2015   Fujikawa et al.
2015/0289398 A1   10/2015   Takase
2017/0027292 A1    2/2017   Hibino

FOREIGN PATENT DOCUMENTS

| | | |
|---|---|---|
| CN | 104582355 | 4/2015 |
| CN | 103687407 B | 3/2017 |
| TW | I397366 B1 | 6/2010 |
| TW | I403248 B1 | 6/2010 |
| TW | I358626 B | 2/2012 |
| TW | 201401981 | 1/2014 |
| TW | 201322873 | 6/2016 |
| TW | 201632773 A | 9/2016 |

\* cited by examiner

CONNECTING STRUCTURE

CROSS REFERENCE TO RELATED APPLICATIONS

This Non-provisional application claims priority under 35 U.S.C. § 119(a) on Patent Application No(s). 108104689 filed in Taiwan, Republic of China on Feb. 13, 2019, the entire contents of which are hereby incorporated by reference.

BACKGROUND

Technology Field

The present disclosure relates to a connecting structure and, in particular, to a connecting structure for fixing a first object and a second object, which are disposed corresponding to each other,

Description of Related Art

In conventional, a screw or a connecting structure is provided to connect and assemble two objects, such as two cases of electronic product. However, an additional tool (e.g. a screw driver) is needed to connect two objects with screws. This can decrease the production speed and increase the manufacturing cost. In addition, the general connecting structure usually comprises a recess disposed on the first object and a hook disposed on the second object. This recess-hook design can fix two separated objects. However, the two fixed objects can be easily separated by applying two opposite external forces.

Therefore, it is desired to provide a connecting structure that can fix two objects for a long time and maintain the fastening effect under the influence of external forces.

SUMMARY

An objective of this disclosure is to provide a connecting structure that can maintain the fastening effect under the influence of external forces, thereby preventing the detachment of assembled objects. In addition, the additional tools (e.g. the ultrasonic welding or screws) are not needed for fixing the objects, so the connecting structure of this disclosure is more convenient and has lower cost.

The present disclosure provides a connecting structure for fixing a first object and a second object, which are disposed corresponding to each other. The connecting structure comprises a first connecting portion and a second connecting portion. The first connecting portion is disposed on the surface of the first object and comprises a first board and a second board. The first board comprises a first body, an extension board and a main rib. The first body extends from the surface of the first object toward the second object. The extension board is disposed at an end of the first body away from the first object, and a first included angle is defined between the extension board and the first body. The main rib is connected to the first object and disposed along the first body and the extension board. The second board comprises a second body and a traction board. The second body connects to the first object and non-parallel connects to the first body. The traction board extends from the second body and connects to the first body and the extension board. The second connecting portion is disposed on the surface of the second object and comprises a base and a non-closed columnar body. The base connects to the second object. The non-closed columnar body connects to the base and comprises a blocking wall and a bottom board. The blocking wall extends from the base toward the first object. The bottom board is disposed at an end of the blocking wall away from the base. The blocking wall and the bottom board form an accommodating space corresponding to the extension board.

In one embodiment, the first connecting portion further comprises a third board extending from the surface of the first object toward the second object and connecting to the second board.

In one embodiment, a stopping board extends from an end of the third board away from the first object, and a second included angle is defined between the stopping board and the third board.

In one embodiment, the second board further comprises an opposing board connecting to the stopping board.

In one embodiment, the second board further comprises a buffer slot disposed between the opposing board and the first object.

In one embodiment, the extension board comprises a reinforced edge disposed along an outer edge of the extension board and connecting to the main rib.

In one embodiment, at least a gap is formed between the opposing board and the stopping board.

In one embodiment, the base comprises a continuous wall and a platform. The continuous wall extends toward the first object along an outer edge of the base. The platform connects to the non-closed columnar body and an end of the continuous wall away from the second object.

In one embodiment, the accommodating space comprises an inner rib connecting to the platform and the bottom board.

In one embodiment, the platform comprises at least a broken hole.

In one embodiment, the base further comprises at least a reinforced channel disposed on the surface of the base and connecting to the second object and the blocking wall.

In one embodiment, the non-closed columnar body further comprises at least a reinforced rib connecting to the blocking wall and extending from the blocking wall along a direction away from the accommodating space.

In one embodiment, the bottom board is configured with at least an extension block, and the extension block is disposed corresponding to the gap.

In one embodiment, the bottom board is configured with at least an outer rib extending along an outer surface of the bottom board, and at least a part of the outer rib connects to the extension block.

In one embodiment, the base further comprises a protrusion base disposed along an inner surface of the blocking wall and connecting to the platform, and the accommodating space comprises an inner rib connecting between the protrusion base and the bottom board.

As mentioned above, the connecting structure of this disclosure can maintain the fastening effect under the influence of external forces, thereby preventing the detachment of assembled objects. In addition, the additional tools (e.g. the ultrasonic welding or screws) are not needed for fixing the objects, so the connecting structure of this disclosure is more convenient and has lower cost.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

The connecting structure of this disclosure can maintain the fastening effect for firmly fixing two objects under the influence of external forces, thereby preventing the detachment of assembled objects. In addition, the additional tools (e.g. the ultrasonic welding or screws) are not needed for fixing the objects, so the connecting structure of this disclosure is more convenient and has lower cost.

Figure 1A:
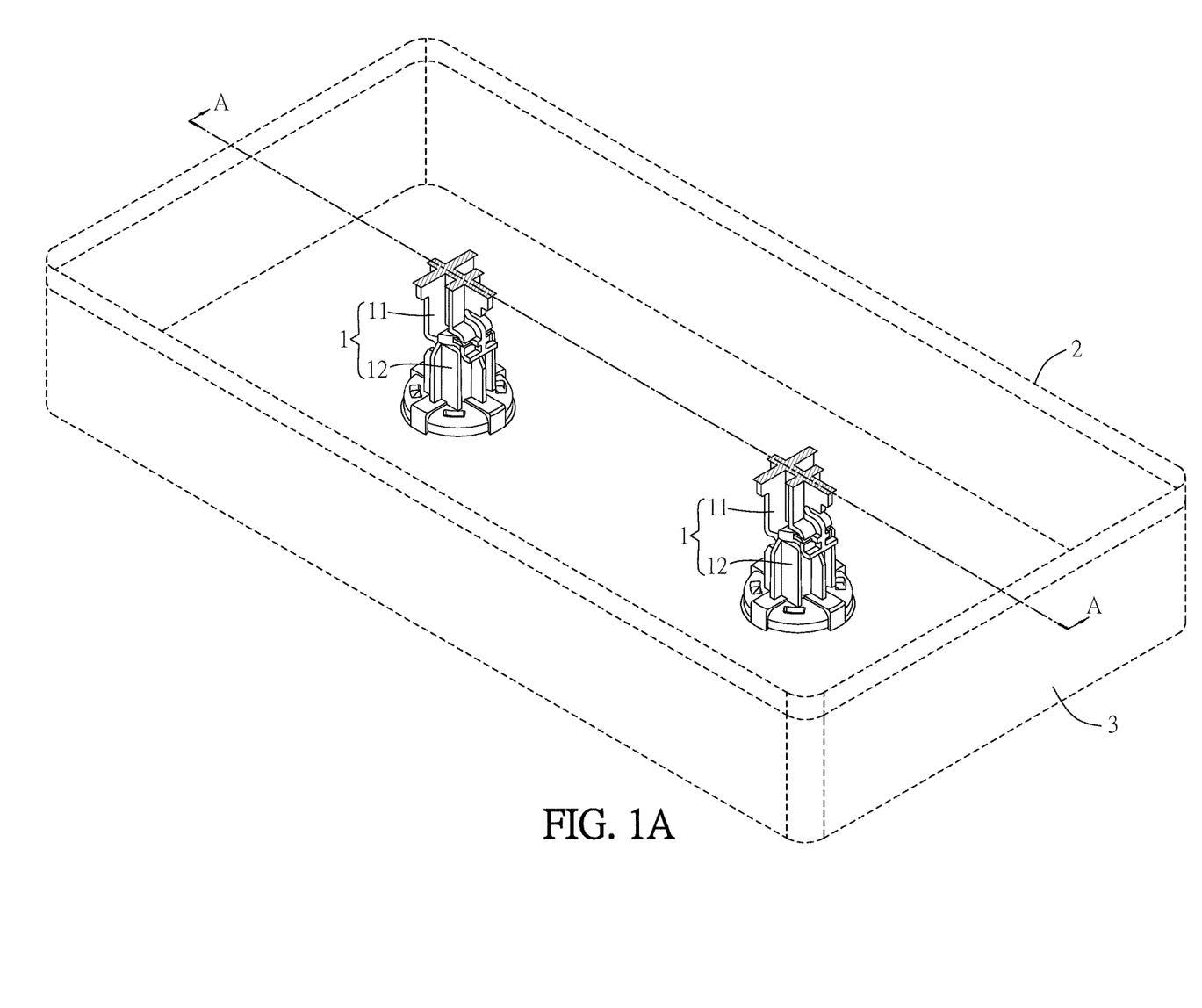
FIG. 1A is a schematic diagram showing the first object and the second object, which are connected by the connecting structure according to a first embodiment of this disclosure.
Figure 1B:
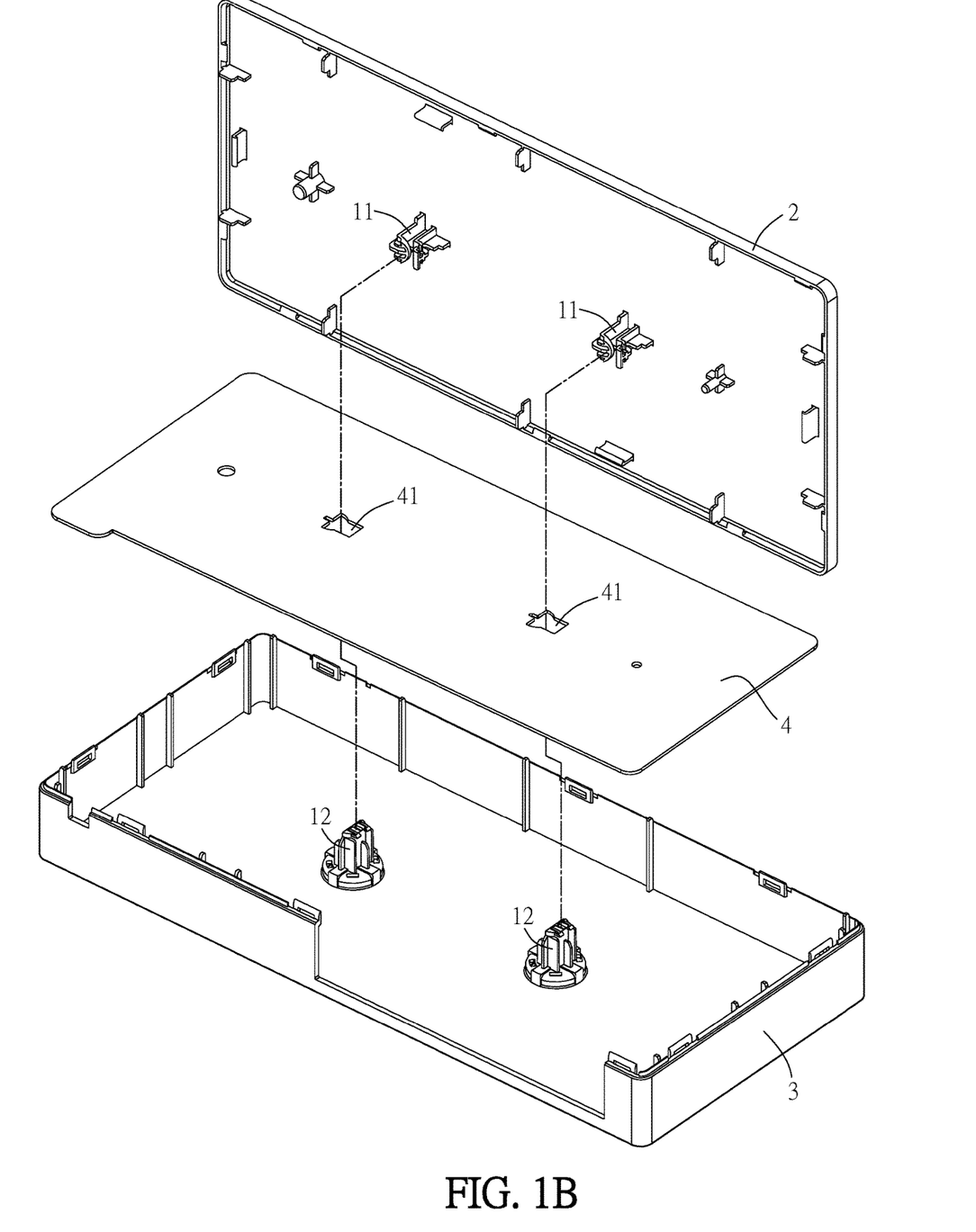
FIG. 1B is an exploded view of the first object, the second object and the connecting structure of FIG. 1A.

FIG. 1A is a schematic diagram showing a first object 2 and a second object 3, which are connected by a connecting structure 1 according to a first embodiment of this disclosure, and FIG. 1B is an exploded view of the first object 2, the second object 3, and the connecting structure 1 of FIG. 1A. As shown in FIGS. 1A and 1B, this disclosure provides a connecting structure 1 for fixing a first object 2 and a second object 3, which are disposed corresponding to each other. The connecting structure 1 comprises a first connecting portion 11 and a second connecting portion 12.

Figure 5:
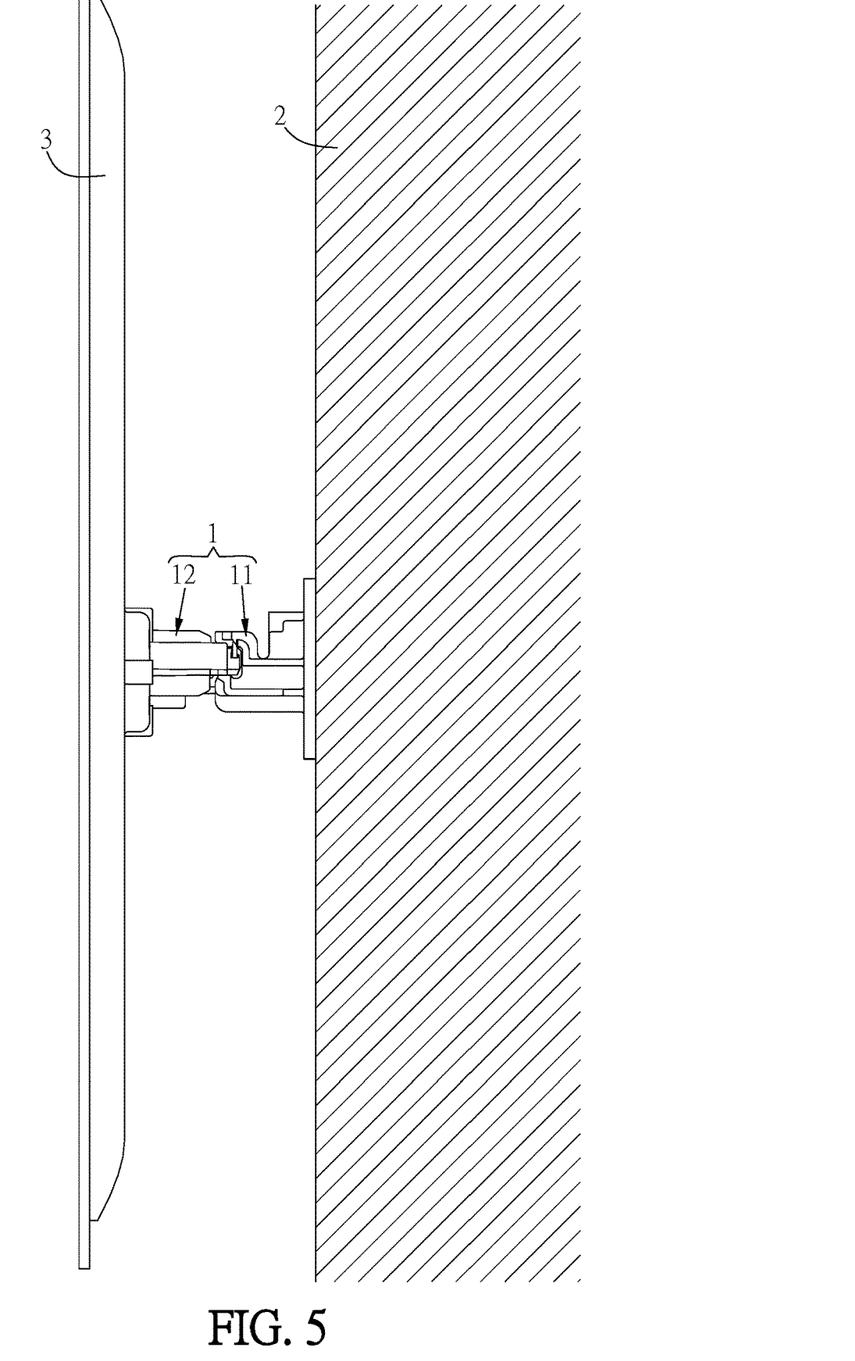
FIG. 5 is a schematic diagram showing the first object and the second object, which are connected by the connecting structure according to a second embodiment of this disclosure.

In order to clearly show the connecting structure 1 in FIG. 1A, the first object 2 and the second object 3 are shown by dotted lines. In this embodiment, the first object 2 and the second object 3 are, for example, the upper case and the lower case of an electronic device, respectively, and the electronic device comprises two connecting structures 1. To be noted, the first object 2 and the second object 3 can be other objects to be fixed with each other, and the amount of the connecting structures 1 can be adjusted according to the requirement of the user. For example, as shown in FIG. 5, the first object 2 is the wall, and the second object 3 is a display device. This disclosure is not limited. As shown in FIG. 1B, the first connecting portion 11 of the connecting structure 1 is disposed on the surface of the first object 2, and the second connecting portion 12 is disposed on the surface of the second object 3. The first connecting portion 11 can be connected with the second connecting portion 12 for connecting the first object 2 (e.g. the upper or first case of the electronic device) and the second object 3 (e.g. the lower or second case of the electronic device). In this embodiment, the electronic device can further comprise a circuit board 4. The circuit board 4 has at least one opening 41, and the second connecting portion 12 can be disposed passing through the opening 41. Accordingly, when the first connecting portion 11 connects to the second connecting portion 12 for connecting the upper case and the lower case, the circuit board 4 can be fixed together. To be noted, although FIG. 1B shows that the circuit board 4 has two openings 41, the amount of the openings 41 can be adjusted according to the requirement of the user corresponding to the amount of the connecting structures 1. This disclosure is not limited thereto.

Figure 2A:
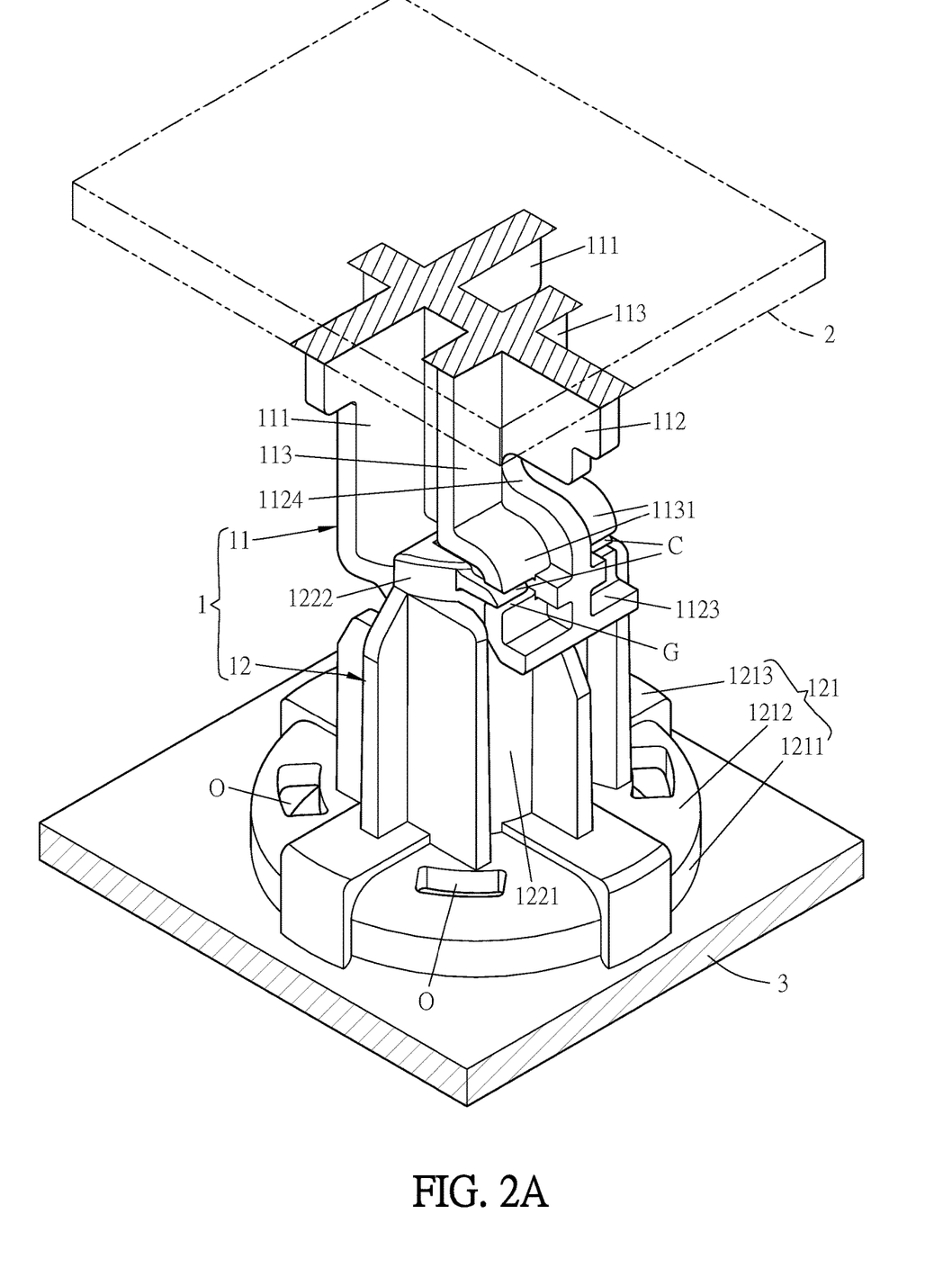
FIG. 2A is a schematic diagram of the connecting structure of FIG. 1A.
Figure 3A:
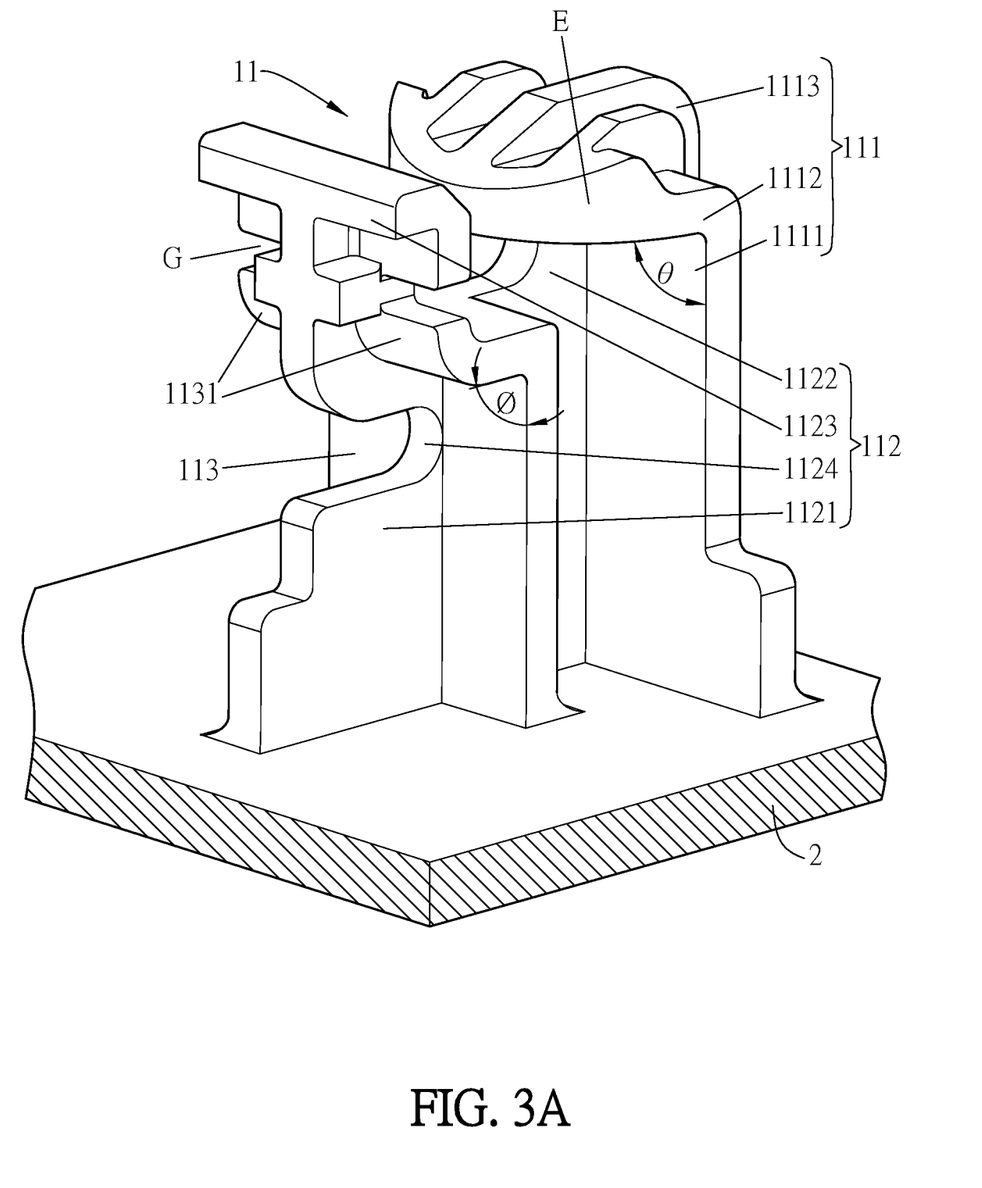
FIG. 3A is a schematic diagram showing the first connecting portion of the connecting structure of FIG. 2A.
Figure 3B:
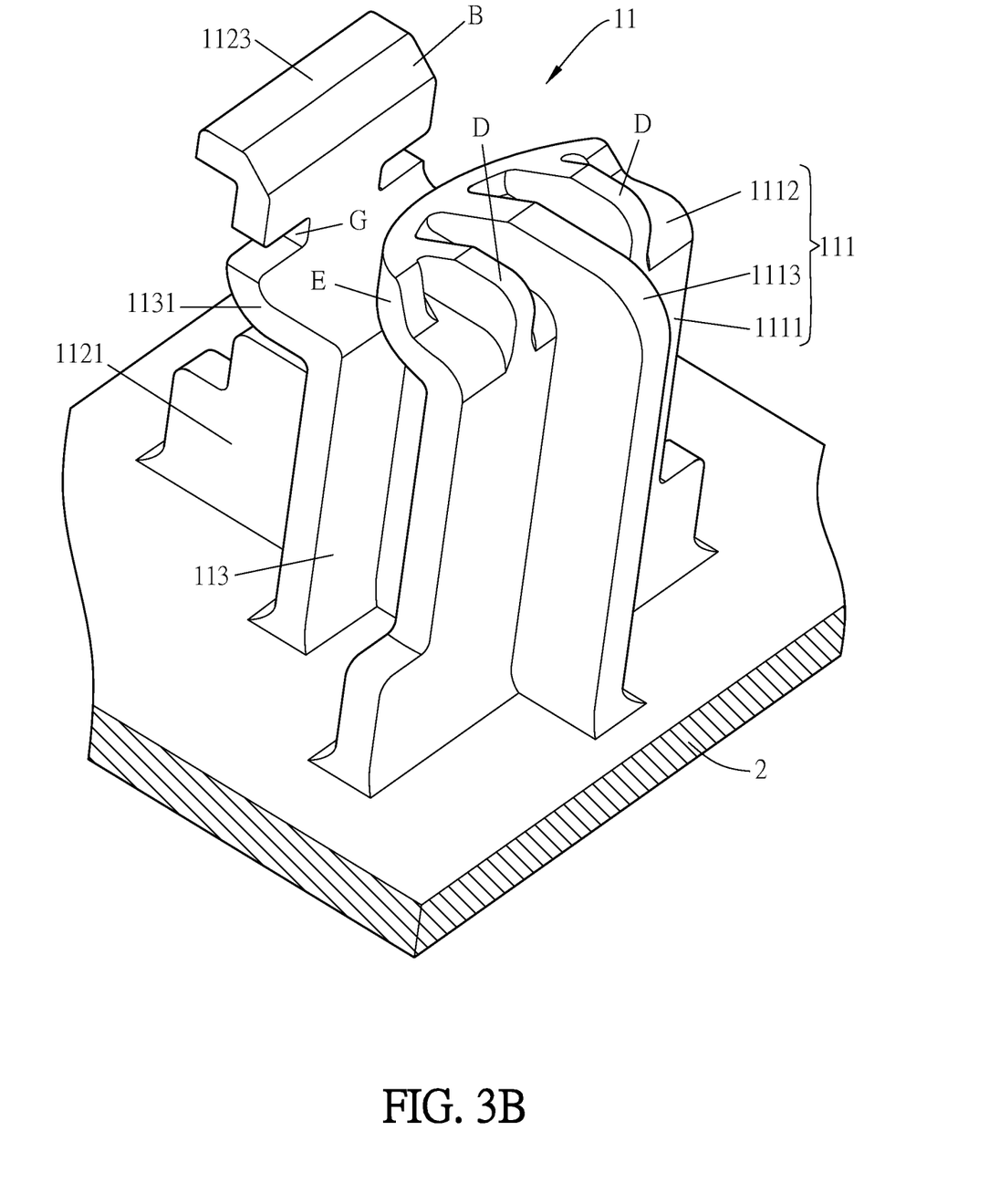
FIG. 3B is another schematic diagram showing the first connecting portion of the connecting structure of FIG. 2A.

FIG. 2A is a schematic diagram of the connecting structure of FIG. 1A, FIG. 3A is a schematic diagram showing the first connecting portion of the connecting structure of FIG. 2A, and FIG. 3B is another schematic diagram showing the first connecting portion of the connecting structure of FIG. 2A. To be noted, FIG. 2A only shows the connecting structure 1 and a part of the first object 2 and the second object 3, and the first object 2 is shown by dotted lines to clearly show the connecting structure 1. In this embodiment, the first connecting portion 11 is disposed on the surface of the first object 2 and comprises a first board 111 and a second board 112. The first board 111 comprises a first body 1111, an extension board 1112 and a main rib 1113. The first body 1111 extends from the surface of the first object 2 toward the second object 3. The extension board 1112 is disposed at an end of the first body 1111 away from the first object 2, and a first included angle θ is defined between the extension board 1112 and the first body 1111. The main rib 1113 is connected to the first object 2 and disposed along the first body 1111 and the extension board 1112. The second board 112 comprises a second body 1121 and a traction board 1122. The second body 1121 connects to the first object 2 and non-parallel connects to the first body 1111. The traction board 1122 extends from the second body 1121 and connects to the first body 1111 and the extension board 1112. Specifically, the second body 1121 of the second board 112 can improve the strength of the first body 1111, and the traction board 1122 of the second board 112 can improve the strength of the extension board 1112. The main rib 1113 can also improve the strengths of the first body 1111 and the extension board 1112. Particularly, it is possible to provide two minor ribs D at two sides of the main rib 1113. The minor ribs D are disposed on the extension board 1112 for improving the strength of the extension board 1112. The amount of the minor ribs D can be adjusted according to the requirement of the user, and this disclosure is not limited. In addition, the first included angle θ can be, for example but not limited to, 90 degrees, 60 degrees, 45 degrees, or 30 degrees. Moreover, since the second body 1121 is non-parallel connects to the first body 1111, an included angle between the second body 1121 and the first body 1111 can be, for example but not limited to, 150 degrees, 120 degrees, 90 degrees, 60 degrees, 45 degrees, or 30 degrees.

Figure 4A:
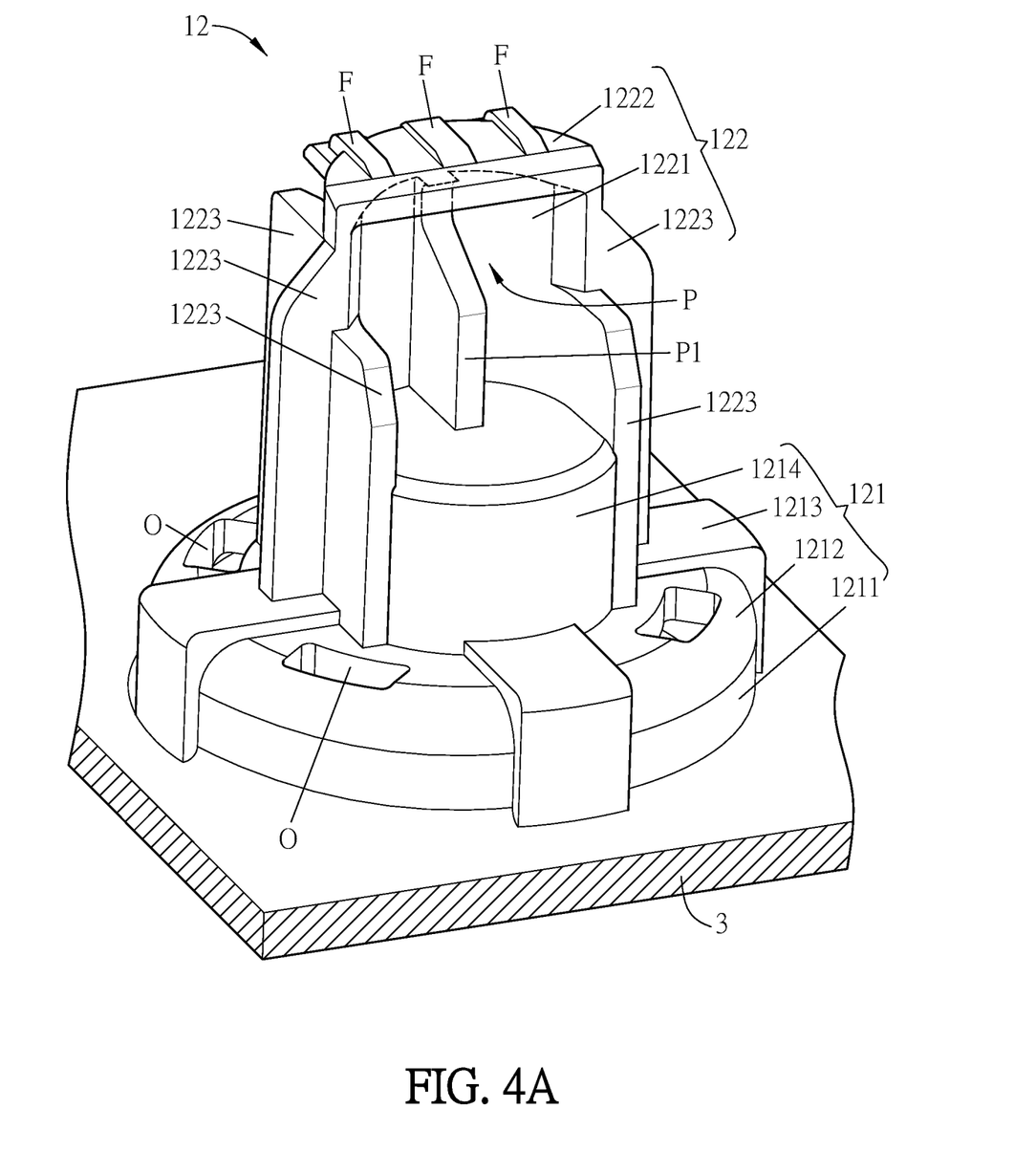
FIG. 4A is a schematic diagram showing the second connecting portion of the connecting structure of FIG. 2A.
Figure 4B:
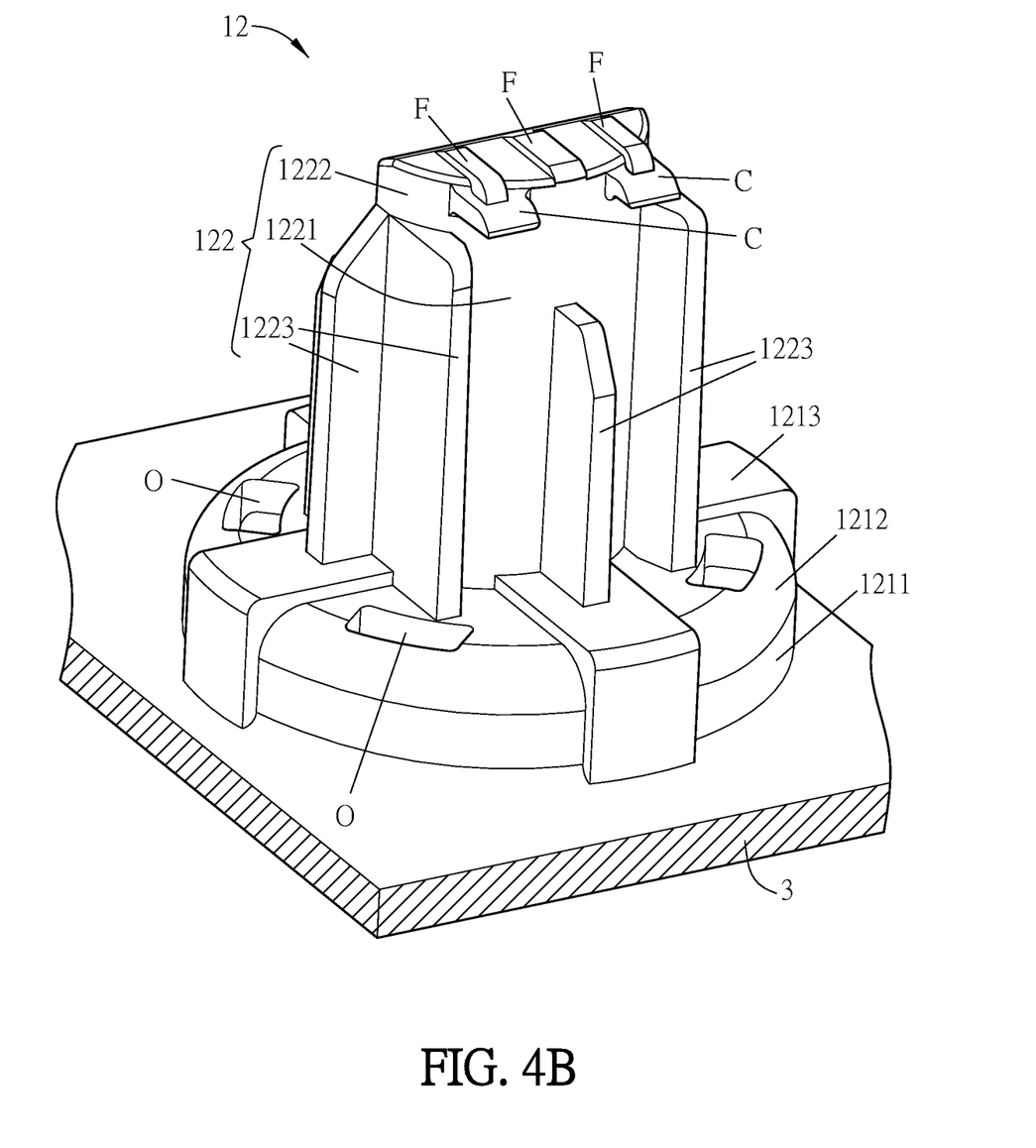
FIG. 4B is another schematic diagram showing the second connecting portion of the connecting structure of FIG. 2A.

FIG. 4A is a schematic diagram showing the second connecting portion 12 of the connecting structure of FIG. 2A, and FIG. 4B is another schematic diagram (viewing in another angle) showing the second connecting portion 12 of the connecting structure of FIG. 2A. Referring to FIGS. 2A, 4A and 4B, the second connecting portion 12 is disposed on the surface of the second object 3 and comprises a base 121 and a non-closed columnar body 122. The base 121 connects to the second object 3. The non-closed columnar body 122 connects to the base 121 and comprises a blocking wall 1221 and a bottom board 1222. The blocking wall 1221 extends from the base 121 toward the first object 2. The bottom board 1222 is disposed at an end of the blocking wall 1221 away from the base 121. The blocking wall 1221 and the bottom board 1222 form an accommodating space P corresponding to the extension board 1112.

Figure 1C:
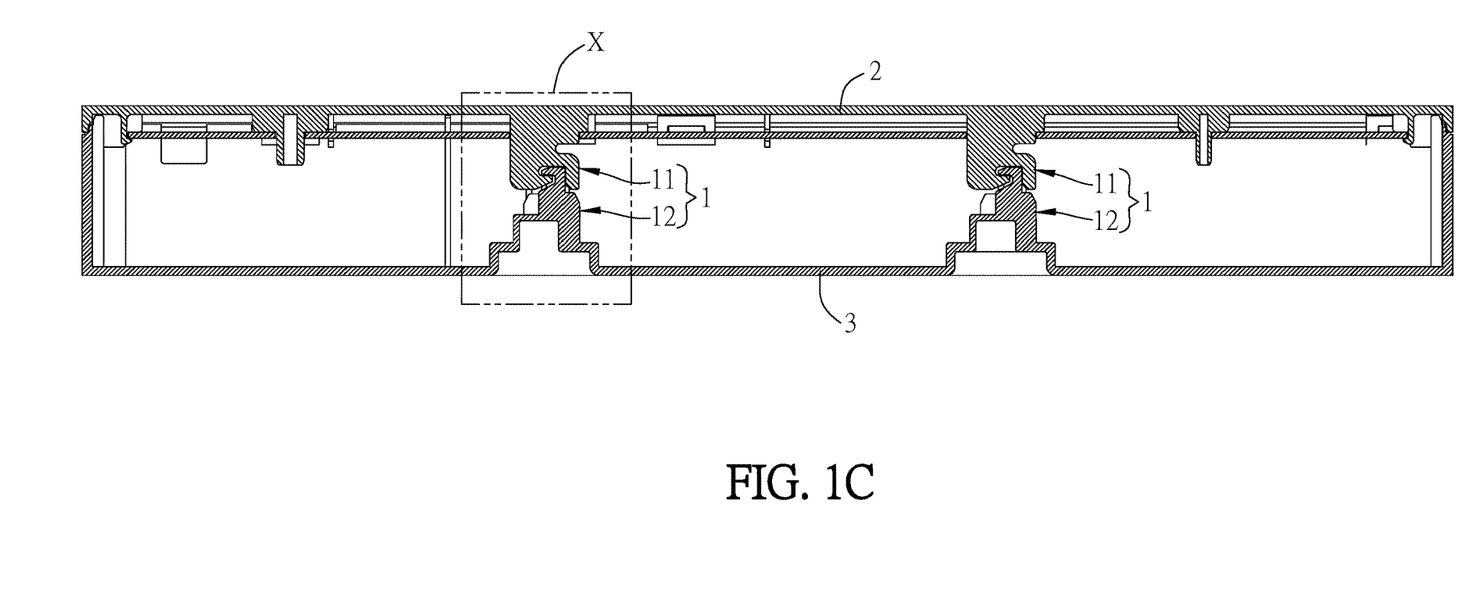
FIG. 1C is a sectional view of the first object and the second object along the line A-A of FIG. 1A.
Figure 1D:
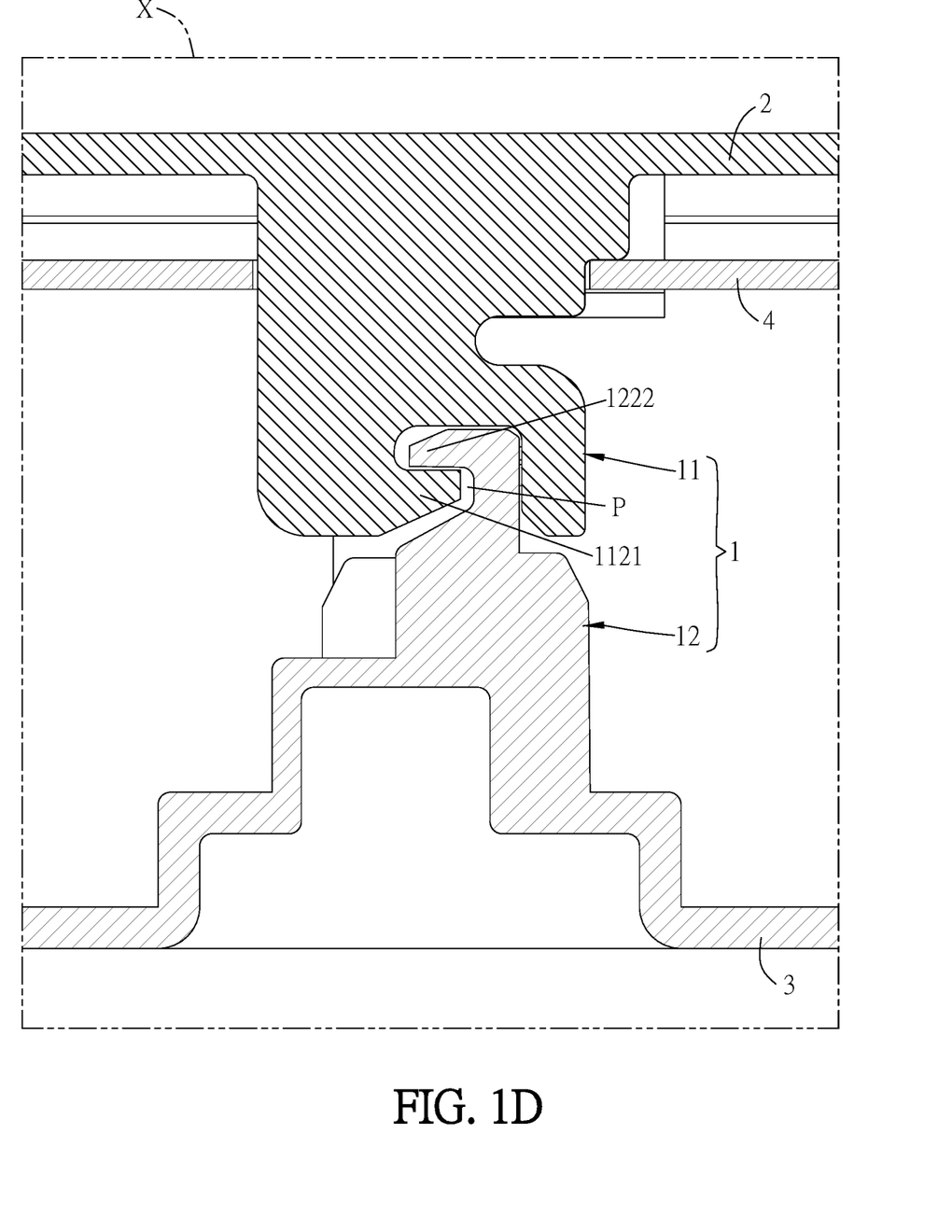
FIG. 1D is a partial enlarged view of the region X of FIG. 1C.

FIG. 1C is a sectional view of the first object 2 and the second object 3 along the line A-A of FIG. 1A, and FIG. 1D is a partial enlarged view of the region X of FIG. 1C. As shown in FIGS. 1C and 1D, the shape of the accommodating space P corresponds to the structure of the extension board 1112 for accommodating the extension board 1112 of the first connecting portion 11. Accordingly, the extension board 1112 can be embedded and fixed in the accommodating space P, thereby fixing the first connecting portion 11 and the second connecting portion 12.

With reference to FIGS. 2A, 3A and 3B, in this embodiment, the first connecting portion 11 further comprises a third board 113, which extends from the surface of the first object 2 toward the second object 3 and connects to the second board 112. To be noted, although the figures show that the third board 113 is disposed at two sides of the second board 112 for fixing the second board and improving the strength of the entire structure, the third board 113 cab be disposed at one side of the second board 112 in another embodiment. This disclosure is not limited thereto.

Figure 2B:
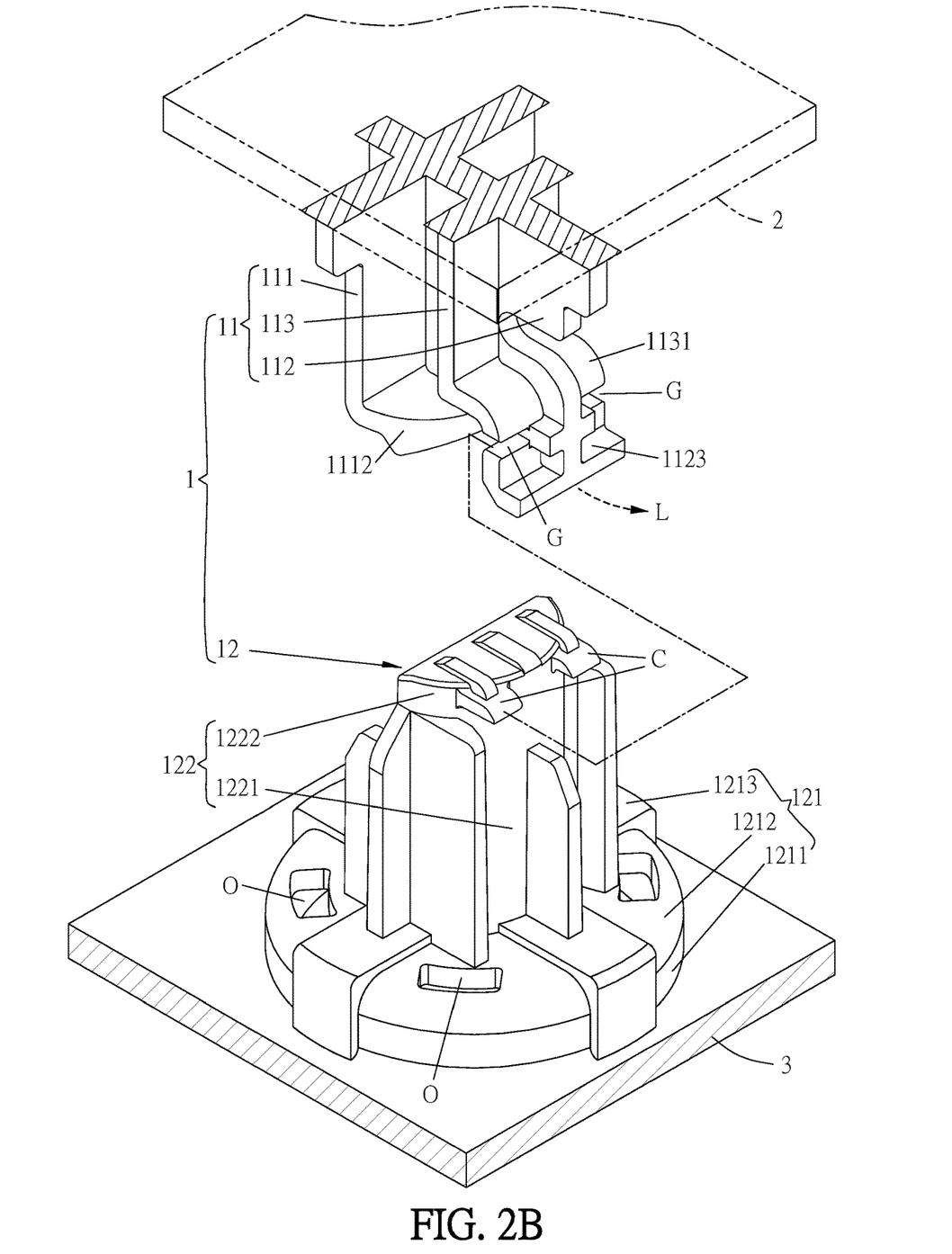
FIG. 2B is an exploded view of the connecting structure of FIG. 2A.

In this embodiment, a stopping board 1131 extends from an end of the third board 113 away from the first object 2, and a second included angle θ is defined between the stopping board 1131 and the third board 113. With reference to FIG. 2B, when assembling the first connecting portion 11 and the second connecting portion 12, the stopping board 1131 can limit the position of the bottom board 1222 of the second connecting portion 12 for firmly connecting the first connecting portion 11 and the second connecting portion 12. In addition, the second included angle θ can be, for example but not limited to, 90 degrees, 60 degrees, 45 degrees, or 30 degrees.

In this embodiment, the second board 112 further comprises an opposing board 1123 connecting to the stopping board 1131. Besides, the second board 112 further comprises a buffer slot 1124 disposed between the opposing board 1123 and the first object 2. Reference to FIG. 2B, when assembling the first connecting portion 11 and the second connecting portion 12, the configuration of the buffer slot 1124 can provide the elasticity to the second board 112. Accordingly, when the opposing board 1123 of the first connecting portion 11 contacts the bottom board 1222 of the second connecting portion 12, the opposing board 1123 can generate an offset toward a direction as the arrow L as shown in figure. After the bottom board 1222 of the second connecting portion 12 enters the gap between the stopping board 1131 and the extension board 1112 of the first connecting portion 11, the opposing board 1123 can return the original position, thereby finishing the assembling of the first connecting portion 11 and the second connecting portion 12.

In this embodiment, the extension board 1112 has a reinforced edge E disposed along an outer edge of the extension board 1112 and connecting to the main rib 1113 for improving the structural strength of the extension board 1112. In another embodiment, the reinforced edge E can be disposed along an outer edge of the extension board 1112 and connect to the main rib 1113 and the minor rib(s) D for improving the structural strength of the extension board 1112.

Referring to FIGS. 2A, 4A and 4B, in this embodiment, the base 121 comprises a continuous wall 1211 and a platform 1212. The continuous wall 1211 extends toward the first object 2 along an outer edge of the base 121. The platform 1212 connects to the non-closed columnar body 122 and an end of the continuous wall 1211 away from the second object 3.

In this embodiment, the base 121 further comprises at least a reinforced channel 1213 disposed on the surface of the base 121 and connecting to the second object 3 and the blocking wall 1221. Specifically, the reinforced channel 1213 can improve the strength of the base 121. Moreover, when forming the second connecting portion 12 on the surface of the second object 3, the materials can flow through the reinforced channel 1213 for forming the complete structure of the second connecting portion 12. To be noted, the materials can be, for example but not limited to, plastics, polymers, or other elastic materials.

In this embodiment, the non-closed columnar body 122 further comprises at least a reinforced rib 1223 connecting to the blocking wall 1221 and extending from the blocking wall 1221 along a direction away from the accommodating space P. The reinforced rib 1223 is configured for improving the strength of the blocking wall 1221. As shown in FIG. 4A, five reinforced ribs 1223 are provided, and they individually extend along different directions away from the accommodating space P. To be noted, the amount of the reinforced ribs 1223 can be adjusted according to the requirement of the user, and this disclosure is not limited thereto.

Referring to FIGS. 2A, 2B, 3A, 3B and 4B, in this embodiment, at least a gap G is formed between the opposing board 1123 and the stopping board 1131 of the first connecting portion 11. In this case, the bottom board 1222 of the second connecting portion 12 is configured with at least an extension block C, and the extension block C is disposed corresponding to the gap G. As mentioned above, when assembling the first connecting portion 11 and the second connecting portion 12, the buffer slot 1124 can provide the elasticity to the second board 112. Accordingly, when the opposing board 1123 of the first connecting portion 11 contacts the bottom board 1222 of the second connecting portion 12, the opposing board 1123 can generate an offset toward a direction as the arrow L of FIG. 2B. After the bottom board 1222 of the second connecting portion 12 enters the gap between the stopping board 1131 and the extension board 1112 of the first connecting portion 11, the opposing board 1123 can return the original position. Then, the extension block C of the bottom board 1222 of the second connecting portion 12 can be correspondingly engaged in the gap G of the first connecting portion 11 for firmly fixing the first connecting portion 11 and the second connecting portion 12. To be noted, as shown in the figure, the first connecting portion 11 comprises two gaps G, and the second connecting portion 12 comprises two extension blocks C. However, the amounts of the gaps G and the extension blocks C can be adjusted according to the requirement of the user, and this disclosure is not limited thereto. In addition, the opposing board 1123 may comprise a guiding angle B for guiding the bottom board 1222 of the second connecting portion 12 into the gap between the stopping board 1131 and the extension board 1112 of the first connecting portion 11.

Referring to FIGS. 2A, 4A and 4B, in this embodiment, the bottom board 1222 is configured with at least an outer rib F extending along an outer surface of the bottom board 1222, and at least a part of the outer rib F connects to at least one extension block C. The outer rib F is configured to improve the strengths of the bottom board 1222 and the extension block C, thereby avoiding the break of the extension block C when applying external forces to the first object 2 and the second object 3. As shown in figures, in other aspects, the bottom board 1222 is configured with three outer ribs F and two extension blocks C. Herein, two of the outer ribs F are connected to the two extension blocks C, respectively. To be noted, the amounts of the outer ribs F and the extension blocks C can be adjusted according to the requirement of the user, and the amount of the outer ribs F can be greater than the amount of the extension blocks C. Only a part of the outer ribs F are connected to the extension blocks C, and this configuration can improve the strengths of the bottom board 1222 and the extension blocks C.

In this embodiment, the accommodating space P comprises an inner rib P1 connecting to the platform 1212 and the bottom board 1222 (not shown). In this embodiment, the base 121 further comprises a protrusion base 1214 disposed along an inner surface of the blocking wall 1221 and connecting to the platform 1212. The accommodating space P comprises an inner rib P1 connecting between the protrusion base 1214 and the bottom board 1222. The inner rib P1 is configured to improve the strengths of the bottom board 1222 and the blocking wall 1221. The material can flow through the channel provided by the protrusion base 1214, thereby forming the complete structure of the second connecting portion 12.

In this embodiment, the platform 1212 comprises at least a broken hole O. As mentioned above, the first connecting portion 11 and the second connecting portion 12 have many structures for improving the strength thereof. Thus, when the first object 2 and the second object 3 are assembled, it is hard to detach them. The design of the broken holes O can help to break the structure of the second connecting portion 12, thereby easily detaching the first object 2 and the second object 3.

FIG. 5 is a schematic diagram showing the first object 2 and the second object 3, which are connected by the connecting structure 1 according to a second embodiment of this disclosure. As shown in FIG. 5, in this embodiment, the first object 2 is a wall, and the second object 3 is a display device. The first connecting portion 11 is disposed on the surface of the first object 2 (the wall), and the second connecting portion 12 is disposed on the surface of the second object 3 (the display device). Accordingly, the display device can be easily mounted on the wall by assembling the first connecting portion 11 and the second connecting portion 12 that correspondingly disposed oppositely. As mentioned in the previous embodiment, the first connecting portion 11 and the second connecting portion 12 of the connecting structure 1 have many structures for improving the strength thereof, so that the two objects cannot be easily detached after assembling the first connecting portion 11 (on the wall) and the second connecting portion 12 (on the display device). In other words, the display device is hard to fall from the wall. To be noted, in the above embodiments, the first connecting portion 11 and the second connecting portion 12 can be formed on the surfaces of the first object 2 and the second object 3, respectively (as shown in FIG. 2A). However, as shown in FIG. 5, the first connecting portion 11 and the second connecting portion 12 can also be disposed on the surfaces of the first object 2 and the second object 3, respectively, by other methods (e.g. adhesion), and this disclosure is not limited thereto.

To sum up, in the connecting structure 1 of this disclosure, the extension board 1112 of the first connecting portion 11 is disposed corresponding to the accommodating space P of the second connecting portion 12, the extension board 1112 of the first connecting portion 11 is disposed corresponding to the bottom board 1222 of the second connecting portion 12, and the gap G of the first connecting portion 11 is disposed corresponding to the extension block C of the second connecting portion 12. These configurations can improve the connecting strength of the first connecting portion 11 and the second connecting portion 12. In addition, the detail structures of the first connecting portion 11 and the second connecting portion 12 can improve the mechanical strengths of the first connecting portion 11 and the second connecting portion 12. Accordingly, the connecting structure of this disclosure can maintain the fastening effect under the influence of external forces, thereby preventing the detachment of assembled objects. In addition, the additional tools (e.g. the ultrasonic welding or screws) are not needed for fixing the objects, so the connecting structure of this disclosure is more convenient and has lower cost.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A connecting structure for fixing a first object and a second object, which are disposed corresponding to each other, comprising:
   a first connecting portion at a first end of the connecting structure configured to be disposed on a surface of the first object and comprising:
      a first board comprising:
         a first body extending from the surface of the first end toward a second end of the connecting structure,
         an extension board disposed at an end of the first body away from the first end, wherein a first included angle is defined between the extension board and the first body, and
         a main rib disposed along the first body and the extension board, reaching the first end and configured to be connected to the first object; and
      a second board comprising:
         a second body non-parallel connecting to the first body, reaching the first end and configured to be connected to the first object, and
         a traction board extending from the second body and connecting to the first body and the extension board; and
   a second connecting portion at the second end of the connecting structure configured to be disposed on a surface of the second object and comprising:
      a base reaching the second end and configured to be connected to the second object; and
      a non-closed columnar body connecting to the base and comprising:
         a blocking wall extending from the base toward the first end, and
         a bottom board disposed at an end of the blocking wall away from the base, wherein the blocking wall and the bottom board form an accommodating space corresponding to the extension board.

2. The connecting structure according to claim 1, wherein the first connecting portion further comprises a third board extending from the first end toward the second end and connecting to the second board.

3. The connecting structure according to claim 2, wherein a stopping board extends from an end of the third board away from the first end, and a second included angle is defined between the stopping board and the third board.

4. The connecting structure according to claim 3, wherein the second board further comprises an opposing board connecting to the stopping board.

5. The connecting structure according to claim 4, wherein the second board further comprises a buffer slot disposed between the opposing board and the first end.

6. The connecting structure according to claim 5, wherein the extension board comprises a reinforced edge disposed along an outer edge of the extension board and connecting to the main rib.

7. The connecting structure according to claim 6, wherein at least a gap is formed between the opposing board and the stopping board.

8. The connecting structure according to claim 7, wherein the base comprises:
- a continuous wall extending toward the first end along an outer edge of the base; and
- a platform connecting to the non-closed columnar body and an end of the continuous wall away from the second end.

9. The connecting structure according to claim 8, wherein the accommodating space comprises an inner rib connecting to the platform and the bottom board.

10. The connecting structure according to claim 9, wherein the platform comprises at least a broken hole.

11. The connecting structure according to claim 10, wherein the base further comprises at least a reinforced channel disposed on the surface of the base and configured to be connected to the second object and the blocking wall.

12. The connecting structure according to claim 11, wherein the non-closed columnar body further comprises at least a reinforced rib connecting to the blocking wall and extending from the blocking wall along a direction away from the accommodating space.

13. The connecting structure according to claim 12, wherein the bottom board is configured with at least an extension block, and the extension block is disposed corresponding to the gap.

14. The connecting structure according to claim 13, wherein the bottom board is configured with at least an outer rib extending along an outer surface of the bottom board, and at least a part of the outer rib connects to the extension block.

15. The connecting structure according to claim 8, wherein the base further comprises a protrusion base disposed along an inner surface of the blocking wall and connecting to the platform, and the accommodating space comprises an inner rib connecting between the protrusion base and the bottom board.

* * * * *